United States Patent
Koshiba

(10) Patent No.: US 6,384,290 B1
(45) Date of Patent: May 7, 2002

(54) OIL-EXTENDED COPOLYMERS FOR SPONGE

(75) Inventor: Junichi Koshiba, Ichihara (JP)

(73) Assignee: Sumitomo Chemical Company, Ltd., Osaka (JP)

(*) Notice: Subject to any disclaimer, the term of this patent is extended or adjusted under 35 U.S.C. 154(b) by 9 days.

(21) Appl. No.: 09/605,717

(22) Filed: Jun. 27, 2000

(30) Foreign Application Priority Data

Jun. 30, 1999 (JP) ............................................ 11-185741

(51) Int. Cl.[7] ...................... C10M 107/16; C08L 47/00; C08F 210/12
(52) U.S. Cl. ........................... 585/10; 585/12; 521/140; 521/144
(58) Field of Search ............................. 521/140; 585/10

(56) References Cited

U.S. PATENT DOCUMENTS

| | | | |
|---|---|---|---|
| 4,252,909 A | * 2/1981 | Honma et al. | 521/144 |
| 4,866,101 A | * 9/1989 | Iwasa et al. | 521/95 |
| 5,093,381 A | 3/1992 | Yamamoto et al. | 521/140 |
| 5,646,224 A | * 7/1997 | Kawata et al. | 526/282 |
| 5,677,382 A | * 10/1997 | Tsuji et al. | 525/237 |
| 5,691,413 A | * 11/1997 | Morikawa et al. | 525/99 |
| 5,962,543 A | * 10/1999 | Kawasaki et al. | 521/140 |
| 6,040,351 A | * 3/2000 | Okita et al. | 521/140 |

FOREIGN PATENT DOCUMENTS

JP 3-20339 1/1991

* cited by examiner

*Primary Examiner*—Ellen M. McAvoy
(74) *Attorney, Agent, or Firm*—Fitch, Even, Tabin & Flannery

(57) ABSTRACT

An oil-extended copolymer for sponge comprising an ethylene-α-olefin nonconjugated diene copolymer satisfying the following conditions (1) to (4), and an extender oil in an amount of 10 to 90 parts by weight based on 100 parts by weight of said copolymer.

(1) a weight ratio of ethylene/α-olefin of 73/27 to 40/60,
(2) an iodine value of 20 to 36 which represents a non-conjugated diene content,
(3) a Mooney viscosity (ML 1+4 (121° C.) in Mooney viscosity according to JIS-K-6300) of 100 to 180 as measured for a mixture formed by compounding 20 parts by weight of an extender oil based on 100 parts by weight of said copolymer, and
(4) a Q-value (a weight average of molecular chain/ number average of molecular chain) of 3 to 5 as measured by gel-permeation chromatography (GPC) of said copolymer.

5 Claims, No Drawings

OIL-EXTENDED COPOLYMERS FOR SPONGE

BACKGROUND OF THE INVENTION

1. Field of the Invention

The present invention relates to oil-extended copolymers for sponge. More precisely, the present invention relates to oil-extended copolymers which can provide sponge rubbers excellent in various properties including long-term compression set properties, sealing properties, low-temperature properties, processabilities, external appearance and so on.

2. Description of Related Art

Ethylene-α-olefin nonconjugated diene copolymer rubbers having superior properties in heat resistance, weathering resistance, processabilities and cost performance have been used in most of sponge rubbers for automobile and construction use. Particularly, they are widely used as materials essential for door seals, trunk seals and window seals of automobiles. Since door seal sponges are used in a compressed state for a long time as sealing materials sandwiched between a door and a body when door is closed, they are preferably less deformed by compression. In other words, seal sponges with a small compression set have been demanded. In addition, it is important that opening and closing of door can be smoothly carried out over a broad range of temperature from a high temperature to a low temperature. Therefore, it is necessary that sponge rubbers also maintain a sufficient softness over a wide range of temperature. In addition to the above described properties necessary for sponge rubbers, it is demanded that they are sufficiently good in processabilities such as kneading property, extruding property, shape retention property and the like. For example, JP-A-3-20339 discloses a use of an ethylene-α-olefin nonconjugated diene copolymer, having a weight ratio of ethylene/α-olefin of 73/27 to 40/60, having an iodine value which represents a non-conjugated diene content of 10 to 36 and having a Mooney viscosity (ML 1+4 (121° C.)) of 135 to 200. Said copolymer, however, does not satisfy a compression set satisfying the current demands.

While the compression set can be improved when Mooney viscosity (ML 1+4 (121° C.)), an indicator for the molecular weight, exceeds 200, the kneading property is deteriorated and carbon aggregation masses are formed. In addition, surface roughening and edge damage may be occurred. Therefore, it is difficult to use copolymers having such a high Mooney viscosity practically.

While JP-A-3-20339 describes use of copolymers having a Mooney viscosity (ML 1+4 (121° C.)) of 165 and 210 as measured without using an extender oil, copolymers having a Mooney viscosity higher than 200 are not well satisfied kneading property.

Under these circumstances, the present inventors have extensively studied for copolymers having no problems described above, as the result, and have found that copolymers obtained by extending a copolymer having a high Mooney viscosity with an extender oil can provide sponge rubbers excellent in various properties including long-term compression set properties, sealing properties, low-temperature properties, processabilities, external appearance and so on. The inventors have completed the present invention.

SUMMARY OF THE INVENTION

The present invention provides an oil-extended copolymer for sponge comprising an ethylene-α-olefin nonconjugated diene copolymer satisfying the following conditions (1) to (4), and an extender oil in an amount of 10 to 90 parts by weight based on 100 parts by weight of said copolymer.

(1) a weight ratio of ethylene/α-olefin of 73/27 to 40/60, (2) an iodine value of 20 to 36 which represents a non-conjugated diene content, (3) a Mooney viscosity (ML 1+4 (121° C.) in Mooney viscosity according to JIS-K-6300) of 100 to 180 as measured for a mixture formed by compounding 20 parts by weight of an extender oil based on 100 parts by weight of said copolymer, and (4) a Q-value (a weight average of molecular chain/number average of molecular chain) of 3 to 5 as measured by gel-permeation chromatography (GPC) of said copolymer.

DETAILED DESCRIPTION OF THE INVENTION

The oil-extended copolymer for sponge to be used in the present invention is an ethylene-α-olefin nonconjugated diene copolymer (hereinafter, referred to as "copolymer") satisfying the above-mentioned conditions (1) to (4).

Said copolymer is preferably a copolymer having a Mooney viscosity exceeding 200 as measured without adding an extender oil.

The α-olefin includes, for example, propylene 1-butene, 1-pentene, 1-hexene, 4-methyl-1-pentene, 1-octene, 1-decene and the like. Among them, propylene and 1-butene are preferred.

The weight ratio of ethylene/α-olefin in the copolymer is 73/27 to 40/60, and preferably 67/33 to 45/55. When the proportion of ethylene is too large, the compression set of the sponge rubber at a lower temperature becomes extremely worse, the recovery property of the sponge rubber becomes remarkably poor and the rubber becomes improper as a sealing material. In contrast, when the proportion of ethylene is too small, the dispersion of reinforcing material such as carbon black, inorganic fillers and the like becomes insufficient, which results in causing surface roughening of the sponge rubber.

The nonconjugated diene includes, for example, linear nonconjugated dienes such as 1,4-hexadiene, 1,6-odtadiene, 2-methyl-1,5-hexadiene, 6-methyl-1,5-heptadiene, 7-methyl-1,6-octadiene and the like; cyclic nonconjugated dienes such as cyclohexadiene, dicyclopentadiene, methyltetraindene, 5-vinylnorbornene, 5-ethylidene-2-norbornene, 6-chloromethyl-5-isopropenyl-2-norbornene; trienes such as 2,3-diisopropylidene-5-norbornene, 2-ethylidene-3-isopropylidene-5-norbornene, 2-propenyl-2, 2-norbornadiene, 1,3,7-octatriene, 1,4,9-decatriene and the like. One of them can be used independently and two or more can be used in combination thereof. Preferred examples are 5-ethylidene-2-norbornene, dicyclopentadiene, or 5-ethylidene-2-norbornene and dicyclopentadiene. It is also possible to use a polyene, in place of the above-mentioned nonconjugated diene, such as 5-vinyl-2-norbornene, 5-(2-propenyl)-2-norbornene, 5-(3-butenyl)-2-norbornene, 5-(4-pentenyl)-2-norbornene, 5-(5-hexenyl)-2-norbornene, 5-(5-heptenyl)-2-norbornene, 5-(7-octenyl)-2-norbornene, 5-methylene-2-norbornene, 6,10-dimethyl-1,5,9-undecatriene, 5,9-dimethyl-1,4,8-detriene, 4-ethylidene-8-methyl-1,7-nonadiene, 13-ethyl-9-methyl-1,9,12-pentadecatriene, 5,9,13-trimethyl-1,4,8,12-tetradecadiene, 8,14,16-trimethyl-1,7,14-hexadecatriene, 4-ethylidene-12-methyl-1,11-pentadecadiene.

The iodine value which represents non-conjugated diene content in the copolymer is 20 to 36, preferably 20 to 32. When the iodine value is too small, problems arise that the compression set of the sponge rubber becomes inferior and that much amount of a vulcanization accelerator is required due to a slow vulcanization rate, which results in causing a blooming. In contrast, when the iodine value is too large, problems arise that the softness of the sponge rubber is deteriorated and that the costs becomes high.

The Mooney viscosity (i.e., ML 1+4 (121° C.) in Mooney viscosity according to JIS-K-6300) of the copolymer is 100 to 180, preferably 110 to 170, as measured for a mixture formed by compounding 20 parts by weight of an extender oil based on 100 parts by weight of said copolymer. The reason why Mooney viscosity (i.e., ML 1+4 (121° C.) in Mooney viscosity according to JIS-K-6300) is measured for a mixture formed by compounding 20 parts by weight of an extender oil based on 100 parts by weight of said copolymer is that, when Mooney viscosity as an indicator for the molecular weight is measured and the measured Mooney viscosity exceeds 200, sometimes Mooney viscosity can not be exactly measured due to slipping between a rotor for detecting torque and the copolymer caused by the structure of measuring apparatus.

When Mooney viscosity (i.e., ML 1+4 (121° C.) in Mooney viscosity according to JIS-K-6300) as measured for a mixture formed by compounding 20 parts by weight of an extender oil based on 100 parts by weight of said copolymer is too low, a desired sponge rubber having a small compression set can not be obtained. In contrast, when Mooney viscosity is too high, variability in the quality of copolymer is liable to be occurred leading to variability in the quality of sponge rubber, practical use thereof becomes sometimes difficult.

In the present invention, the amount of an extender oil, compounded to the copolymer, is 10 to 90 parts by weight, preferably 20 to 80 parts by weight, based on 100 parts by weight of said copolymer. When the amount of the extender oil is too small, the kneading property of the copolymer becomes worse and an aggregation mass of carbon may be formed. In addition, surface roughening, edge damage or the like of the extruded product is occurred. The present invention is directed to an improvement in kneading property of such a high Mooney viscosity product by adding an extender oil. On the other hand, when the amount of the extender oil is too large, the dispersion of reinforcing materials such as carbon black, inorganic fillers and the like during kneading becomes insufficient resulting in deterioration of sponge rubber properties since the viscosity before kneading of the copolymer containing the extender oil becomes too low.

The extender oil refers to oils which are added and mixed in the course of production of the copolymer of the present invention. In the case of high Mooney viscosity copolymer, when a plasticizer such as a process oil is added during a series of kneading steps in which carbon black, inorganic fillers or the like is added to the copolymer, the kneading property is not improved. The processability in the subsequent step is improved and extrusion surface of the extruded product with an extruder is improved by compounding 10 to 90 parts by weight of an extender oil per 100 parts by weight of the copolymer before the series of kneading steps. On the other hand, as the extender oil to be added for measuring Mooney viscosity of the copolymer as described above any extender oil can be used for measurement without limiting to oils which are usually added and mixed by the synthetic rubber manufacturer in the course of production.

As the extender oil, paraffin process oils, naphthene process oils, aromatic process oils and the like are used. The extender oil have generally a kinematic viscosity at 100° C. of generally 5 to 35 $mm^2/s$.

The Q-value (i.e., a weight average of molecular chain/number average of molecular chain) as measured by GPC of the ethylene-α-olefin nonconjugated diene copolymer is 3 to 5, preferably 3 to 4. Generally, it is said that when said Q-value is large, the molecular weight distribution is wide, and the kneading property and the extruding property are improved. In the high Mooney viscosity copolymer of the present invention, when the Q-value is too large, the molecular weight in a high molecular weight fraction becomes larger, resulting in insufficient dispersion of reinforcing materials such as carbon black, inorganic fillers and the like and thus causing deterioration of physical properties of sponge rubber. In contrast, when the Q-value is too small, kneading property with open rolls or the like becomes bad and the use thereof becomes difficult.

Conditions for GPC measurement are shown below:
GPC: Model 150C-PLUS manufactured by Waters
Column: TSK-GEL GMHHR-H(S) manufactured by Tosoh, two columns
Sample size: 300 $\mu l$ (polymer concentration: 0.1% by weight)
Flow rate: 1 ml/min.
Temperature: 140° C.
Solvent: o-dichlorobenzene A calibration curve is prepared according to a conventional method using standard polystyrene manufactured by Toyo Soda.

The process for producing ethylene-α-olefin nonconjugated diene copolymer of the present invention is not particularly limited. The copolymer can be produced using various catalysts such as titanium catalysts, vanadium catalysts, metallocene catalysts and the like.

In addition, various additives can be added to the oil-extended copolymer for sponge of the present invention. The additives include plasticizer, foaming agent, vulcanizing agent, vulcanization accelerator, vulcanization aid, resin, filler and the like. The plasticizer herein refers to plasticizer to be added during a series of kneading steps in which carbon black, inorganic filler or the like is added to the oil-extended copolymer for sponge of the invention. The plasticizer includes plasticizers generally used in rubbers, for example, process oils, lubricating oils, paraffin, liquid paraffin, petroleum asphalt, Vaseline, coal tar pitch and the like; castor oil, linseed oil, factis, bees wax, ricinolic acid, palmitic acid, barium stearate, calcium stearate, zinc laurate, atactic polypropylene, cumarone-indene resin and the like. Among them, process oils are particularly preferred. The amount of plasticizer used is within a range preferably of 10 to 150 parts by weight, more preferably of 30 to 150 parts by weight, most preferably 50 to 150 parts by weight, based on 100 parts of the copolymer. By using the plasticizer within such a range, a sponge rubber having excellent in softness can be obtained.

The vulcanizing agent used in the present invention includes sulfur, sulfur chloride, sulfur dichloride, 4,4'-dithiodimorpholine, morpholine disulfide, alkylphenol disulfide, tetramethylthiuramdisulfide, selenium dimethyldithiocarbamate, dicumyl peroxide, 2,5-dimethyl-2,5-di(tert-butylperoxy)hexane, 2,5-dimethyl-2,5-di(benzoylperoxy)hexane, 2,5-dimethyl-2,5-di(tert-butylperoxy)hexyne-3, di-tert-butyl peroxide, di-tert-butyloxy-3,3,5-trimethylcyclohexane, tert-butyl hydroperoxide and the like. Particularly preferred are sulfur, dicumyl peroxide, di-tert-butyl peroxide and di-tert-butyl-3,3,5-trimethylcyclohexane.

Sulfur is used within a range preferably of 0.1 to 10 parts by weight, more preferably of 0.5 to 5 parts by weight, based on 100 parts of the copolymer. The organic peroxides are used within a range preferably of 0.1 to 15 parts by weight, more preferably of 0.5 to 8 parts by weight, based on 100 parts of the copolymer.

In addition, when sulfur or a sulfur compound is used as a vulcanizing agent, a vulcanization accelerator or a vulcanization aid is co-used, if necessary. The vulcanization accelerator includes N-cyclohexyl-2-benzothiazolesulfenamide, N-oxydiethylene-2-benzothiazolesulfenamide, N,N-diisopropyl-2-benzothiazolesulfenamide, 2-mercaptobenzothiazole, 2-(2,4-dinitrophenyl)mercaptobenzothiazole, 2-(2,6-diethyl-4-morpholinothio)benzothiazole, dibenzothiazyldisulfide, diphenylguanidine, triphenylguanidine, di-o-tolylguanidine, o-tolylbiguanide, diphenylguanidine phthalate, acetaldehyde-aniline reaction product, butyraldehyde-aniline condensation product, hexamethylenetetramine, acetaldehyde ammonia, 2-mercaptoimidazoline, thiocarbanilide, diethylthiourea, dibutylthiourea, trimethylthiourea, di-o-tolylthiourea, tetramethylthiuram monosulfide, tetramethylthiuram disulfide, tetraethylthiuram disulfide, tetrabutylthiuram disulfide, dipentamethylenethiuram tetrasulfide, zinc dimethyldithiocarbamate, zinc diethylthiocarbamate, zinc di-n-butyldithiocarbamate, zinc ethylphenyldithiocarbamate, zinc butylphenyldithiocarbamate, sodium dimethyldithiocarbamate, selenium dimethyldithiocarbamate, tellurium diethyldithiocarbamate, zinc dibutylxantogenate, ethylenethiourea and the like. The vulcanization accelerators are used within a range preferably of 0.1 to 20 parts by weight, more preferably of 0. 2 to 10 parts by weight, based on 100 parts of the copolymer.

The vulcanization aid includes metal oxide such as magnesium oxide, zinc oxide and the like, zinc oxide is preferably used. Usually, the vulcanization aids are used within a range preferably of 3 to 20 parts by weight based on 100 parts of the copolymer.

For cross-linking with a peroxide, a cross-linking aid may be used such as sulfur, polyethylene glycol dimethacrylate, diallyl phthalate, triallyl cyanurate, divinylbenzene, quinone dioxime aids including p-quinone dioxime, and the like.

The fillers used in the present invention preferably include carbon black generally used in rubbers such as SRF, GPF, FEF, HAF, ISAF, SAF, FT, MT and the like; inorganic fillers such as fine powder silicic acid, calcium carbonate, talc, clay and the like.

The foaming agent used in the present invention includes sodium bicarbonate, sodium carbonate, ammonium bicarbonate, ammonium nitrite, N,N'-dimethyl-N,N'-dinitron-terephthalamide, N,N'-dinitron-pentamethylenetetramine, azodicarbonamide, azobisisobutyronitrile, azocyclohexylnitrile, azodiaminobenzene, barium azodicarboxylate, benzenesulfonyl hydrazide, toluenesulfonyl hydrazide, p,p'-oxybis (benzenesulfonyl hydrazide), diphenylsulfone-3,3'-disulfonyl hydrazide, calcium azide, 4,4'-diphenyldisulfonyl azide p-toluenesulfonyl azide and the like. The foaming agents are used within a range preferably of 0.5 to 30 parts by weight, more preferably of 1 to 15 parts by weight, based on 100 parts of the copolymer. In addition, a foaming aid may be used together with the foaming agent, if necessary.

Furthermore, as an ingredient for the sponge rubber, another kind of rubber or another ethylene-α-olefin nonconjugated diene copolymer may be used in admixture with the oil-extended copolymer of the present invention.

In the present invention, a conventionally known kneading machine, extruder and foaming apparatus can be applied. Precisely, the oil-extended copolymer for sponge of the present invention is mixed with ingredients as described above and the mixture is subjected to treatment with an open roll mill, Banbury mixer, kneader or the like, followed by cross-linking with foaming at a temperature enabling foaming and vulcanization.

As described in detail, the present invention could provide oil-extended copolymers for sponge which can provide sponge rubbers excellent in various properties including long-term compression set properties, sealing properties, low-temperature properties, processabilities, external appearance and so on. Sponge rubbers having these excellent properties can be used as a sealing material for automobile, a sealing material for construction and be used in wide spread other fields.

EXAMPLES

The present invention will now be described specifically with reference to Examples, which should not be construed as a limitation upon the scope of the invention.

Examples 1–6 and Comparative Examples 1–3

Structures of oil-extended (or non-extended) copolymers used in Examples 1–6 and Comparative Examples 1–3 are shown in Table 1 and Table 2. The difference in A and B indicating oil-extended (or non-extended) copolymers shown in Table 1 and Table 2 is that the copolymers have the same structure but contain different amount of extender oils. Similarly, differences among C, D, E and F are that the copolymers have the same structure but contain different amount of extender oils.

Using a Banbury mixer (having an internal space of 1.5 liter), an oil-extended (or non-extended) copolymer, a process oil, a carbon black, calcium carbonate, stearic acid and zinc oxide included in compositions shown in Table 3 and Table 4 were kneaded. Then, using 8-inch open rolls, remaining ingredients shown in Table 3 and Table 4 were added to form a compound. The amount of the process oil added was adjusted so that Mooney viscosities of unvulcanized compounds for Examples 1–6 and Comparative Examples 1–3 became constant. This was performed in order to maintain respective conditions for extrusion and to maintain specific gravities of sponges obtained in Examples 1–6 and Comparative Examples 1–3. Subsequently, a tubular dye (having an inside diameter of 10 mm and thickness of 1.5 mm) was mounted on a 45 mm extruder and the compounds were extruded under conditions of a dye temperature of 80° C. and a cylinder temperature of 60° C. to mold them in a tubular form. Evaluations for extruded surface shown in Table 3 and Table 4 were conducted by external appearance of smoothness of tubes. The molded tubes were introduced into a hot air vulcanization vessel at 230° C. and heated for 4 minutes to obtain tubular sponge rubbers. For the measurement of specific gravity of sponge rubbers, a segment having a length of 50 mm was used as a test piece. The volume of the test piece was obtained from its weight in the air and buoyancy when it was placed in water. For the measurement of compression set, the sponge rubber was cut to pieces having a length of 20 mm and it was used as a test piece. The piece was compressed by 50% from its original outside diameter in a compression set measuring mold and subjected to heat treatment with a Geer oven at 70° C. for 200 hours. The physical test method for expanded rubber (SRIS-0101) was applied. The respective results of evaluation are shown in Table 3 and Table 4.

In Examples 1–6 which satisfy the constitution requirements of the present invention, the sponge rubbers had respectively less compression sets and good extrusion surfaces. On the other hand, in Comparative Examples 1–2 in which the copolymers had Mooney viscosities less than the range defined in the present invention, while the sponge rubbers had good surfaces, they had unsatisfactorily larger compression set. In Comparative Example 3 in which the copolymer had a Mooney viscosity within a range of the present invention but did not compound an extender oil, while the sponge rubber had a small compression set, it had an unsatisfactorily bad extrusion surface.

TABLE 1

|  | Example 1 | Example 2 | Example 3 | Example 4 | Example 5 | Example 6 |
|---|---|---|---|---|---|---|
| Structure of oil-extended (or non-extended) copolymer used |  |  |  |  |  |  |
| Identification of oil-extended (or non-extended) copolymer 1) | D | E | F | G | H | I |
| Structure of copolymer 1) |  |  |  |  |  |  |
| Weight ratio: ethylene/propylene | 60/40 | 60/40 | 60/40 | 60/40 | 60/40 | 60/40 |
| Iodine value | 24 | 24 | 24 | 28 | 24 | 24 |
| Q-value by GPC measurement | 3.4 | 3.4 | 3.4 | 3.3 | 3.9 | 4.8 |
| $ML_{1+4}$ 121° C. 2) |  |  |  |  |  |  |
| $ML_{1+4}$ 121° C. 3) | 103 | 103 | 103 | 123 | 105 | 102 |
| $ML_{1+4}$ 121° C. 4) | 81 | 81 | 81 |  |  |  |
| $ML_{1+4}$ 121° C. 5) | 64 | 64 | 64 |  | 65 | 63 |
| Amount of extender oil 6) | 20 | 30 | 40 | 20 | 40 | 40 |

TABLE 2

|  | Comparative example 1 | Comparative example 2 | Comparative example 3 |
|---|---|---|---|
| Structure of oil-extended (or non-extended) copolymer used |  |  |  |
| Identification of oil-extended (or non-extended) copolymer 1) | A | B | C |
| Structure of Copolymer 1) |  |  |  |
| Weight ratio: ethylene/propylene | 60/40 | 60/40 | 60/40 |
| Iodine value | 22 | 22 | 24 |
| Q-value by GPC measurement | 3.5 | 3.5 | 3.4 |
| $ML_{1+4}$ 121° C. 2) | 165 | 165 |  |
| $ML_{1+4}$ 121° C. 3) | 85 | 85 | 103 |
| $ML_{1+4}$ 121° C. 4) |  |  | 81 |
| $ML_{1+4}$ 121° C. 5) |  |  | 64 |
| Amount of extender oil 6) | 0 | 20 | 0 |

TABLE 3

|  | Example 1 | Example 2 | Example 3 | Example 4 | Example 5 | Example 6 |
|---|---|---|---|---|---|---|
| Ingredient (parts by weight) |  |  |  |  |  |  |
| Oil-extended (or non-extended) copolymer 1) | 120 | 130 | 140 | 120 | 140 | 140 |
| (Kind) | (D) | (E) | (F) | (G) | (H) | (I) |
| Process oil 7) | 85 | 75 | 65 | 90 | 65 | 65 |
| Carbon black 8) | 75 | 75 | 75 | 75 | 75 | 75 |
| Calcium carbonate | 20 | 20 | 20 | 20 | 20 | 20 |

TABLE 3-continued

|  | Example 1 | Example 2 | Example 3 | Example 4 | Example 5 | Example 6 |
|---|---|---|---|---|---|---|
| Stearic acid | 1 | 1 | 1 | 1 | 1 | 1 |
| Zinc oxide | 5 | 5 | 5 | 5 | 5 | 5 |
| Other ingredients 9) | 12.1 | 12.1 | 12.1 | 12.1 | 12.1 | 12.1 |
| Evaluation |  |  |  |  |  |  |
| Mooney viscosity of unvulcanized compound ML 1+4 100° C. 10) | 37 | 37 | 38 | 39 | 38 | 37 |
| Sponge properties |  |  |  |  |  |  |
| Specific gravity | 0.57 | 0.56 | 0.57 | 0.56 | 0.56 | 0.57 |
| Compression set % | 16.5 | 16.3 | 16.7 | 14.5 | 16.5 | 16.6 |
| Extrusion surface | Good | Good | Good | Good | Good | Partly good |

TABLE 4

|  | Comparative example 1 | Comparative example 2 | Comparative example 3 |
|---|---|---|---|
| Ingredient (parts by weight) |  |  |  |
| Oil-extended (or non-extended) copolymer 1) | 100 | 120 | 100 |
| (Kind) | (A) | (B) | (C) |
| Process oil 7) | 95 | 75 | 105 |
| Carbon black 8) | 75 | 75 | 75 |
| Calcium carbonate | 20 | 20 | 20 |
| Stearic acid | 1 | 1 | 1 |
| Zinc oxide | 5 | 5 | 5 |
| Other ingredients 9) | 12.1 | 12.1 | 12.1 |
| Evaluation |  |  |  |
| Mooney Viscosity of unvulcanized compound ML 1 + 4 100° C. 10) | 38 | 37 | 38 |
| Sponge properties |  |  |  |
| Specific gravity | 0.58 | 0.57 | 0.58 |
| Compression set % | 18.3 | 18.1 | 16.6 |
| Extrusion surface | Good | Good | Bad |

(Legends of Tables)

Blank cells show that the corresponding measurement was not carried out.

1) Ethylene-propylene-ethylidenenorbornene copolymer
2) Mooney viscosity (ML 1+4 (121° C.) in Mooney viscosity according to JIS-K-6300) measured without using an extender oil
3) Mooney viscosity (ML 1+4 (121° C.) in Mooney viscosity according to JIS-K-6300) measured for a mixture formed by compounding 20 parts by weight of an extender oil based on 100 parts by weight of copolymer
4) Mooney viscosity (ML 1+4 (121° C.) in Mooney viscosity according to JIS-K-6300) measured for a mixture formed by compounding 30 parts by weight of an extender oil based on 100 parts by weight of copolymer
5) Mooney viscosity (ML 1+4 (121° C.) in Mooney viscosity according to JIS-K-6300) measured for a mixture formed by compounding 40 parts by weight of an extender oil based on 100 parts by weight of copolymer
6) Amount (parts by weight) of an extender oil based on 100 parts by weight of copolymer 7) "PW90" manufactured by Idemitsu Kosan Co., Ltd.
8) "Asahi 50HG" manufactured by Asahi carbon Co.
9) 2 parts by weight of calcium oxide, 1.2 part by weight of sulfur, 3.2 parts by weight of 4,4'-oxybisbenzenesulfonyl hydrazide "NEOCELLBORN N 1000S", a foaming agent manufactured by EIWA CHEMICAL IND.CO.LTD.; 5.1 parts by weight of a mixture of vulcanization accelerators M, BZ, TRA, 22 and PZ; and 0.6 part by weight of "VULNOC R" manufactured by Ohuchi Shinko Kagaku.
10) ML 1+4 (100° C.) in Mooney viscosity according to JIS-K-6300.

What is claimed is:

1. An oil-extended copolymer for sponge comprising an ethylene-α-olefin nonconjugated diene copolymer satisfying the following conditions (1) to (4), and an extender oil in an amount of 10 to 90 parts by weight based on 100 parts by weight of said copolymer (1) a weight ratio of ethylene/α-olefin of 73/27 to 40/60,
   (2) an iodine value of 20 to 36 which represents a non-conjugated diene content,
   (3) a Mooney viscosity (ML 1+4 (121° C.) in Mooney viscosity according to JIS-K-6300) of 100 to 180 as measured for a mixture formed by compounding 20 parts by weight of an extender oil based on 100 parts by weight of said copolymer, and
   (4) a Q-value (a weight average of molecular chain/number average of molecular chain) of 3 to 5 as measured by gel-permeation chromatography (GPC) of said copolymer.

2. The oil-extended copolymer for sponge according to claim 1, wherein the weight ratio of ethylene/α-olefin is 67/33 to 45/55.

3. The oil-extended copolymer for sponge according to claim 1, wherein the iodine value is 20 to 32.

4. The oil-extended copolymer for sponge according to claim 1, wherein the α-olefin is propylene.

5. The oil-extended copolymer for sponge according to claim 1, wherein the nonconjugated diene is 5-ethylidene-2-norbornene or a dicyclopentadiene.

* * * * *